United States Patent [19]

McKinney et al.

[11] Patent Number: 4,924,380
[45] Date of Patent: May 8, 1990

[54] DUAL ROTATING PRIORITY ARBITRATION METHOD FOR A MULTIPROCESSOR MEMORY BUS

[75] Inventors: Steven J. McKinney, Coral Springs; William E. Earnshaw, N. Lauderdale, both of Fla.

[73] Assignee: Modular Computer Systems, Inc. (Florida Corporation), Ft. Lauderdale, Fla.

[21] Appl. No.: 208,506

[22] Filed: Jun. 20, 1988

[51] Int. Cl.⁵ .............................................. G06F 13/18
[52] U.S. Cl. ................................ 364/200; 364/242.6; 364/935.41; 364/937.01
[58] Field of Search ... 364/200 MS File, 900 MS File

[56] References Cited

U.S. PATENT DOCUMENTS

| | | | |
|---|---|---|---|
| 4,473,880 | 9/1984 | Budde et al. | 364/200 |
| 4,719,622 | 1/1988 | Whipple et al. | 364/200 |
| 4,760,515 | 7/1988 | Malmquist et al. | 364/200 |

*Primary Examiner*—Gareth D. Shaw
*Assistant Examiner*—Gopal C. Ray
*Attorney, Agent, or Firm*—Spencer & Frank

[57] ABSTRACT

In a multiprocessor system with a common bus and a central arbitration controller, which samples the request status of every system agent, the arbitration controller grants bus accesses based on an arbitration scheme consisting of two rotating queues with a fixed priority between the queues.

7 Claims, 4 Drawing Sheets

DUAL ROTATING PRIORITY ARBITRATION METHOD FOR A MULTIPROCESSOR MEMORY BUS

BACKGROUND OF THE INVENTION

A multiprocessor computer system is one which contains several central processing units (CPUs) which perform operations or tasks jointly. A multiprocessor system can be based on a central memory subsystem and connected internally via a common memory bus (see FIG. 1). The common memory bus supports all communications between CPU elements (agents), I/O agents and memory agents. CPU and I/O agents are called non-memory agents and transfer and receive data to and from the memory agents over the common bus.

Access to the common memory bus is controlled by a central arbitrator controller. Non-memory agents and memory agents request access to the bus and access is granted based on an arbitration scheme contained in the central arbitration controller (see FIG. 2).

Arbitration is a means to granting each agent control of the bus in an equitable fashion. The arbitration protocol connects and disconnects agents to and from shared resources. In addition to protocol there is a method to dictate how arbitration between two or more agents is performed which is called the arbitration algorithm or scheme. The two main schemes generally used in high speed computers are fixed priority and rotating priority.

In a fixed priority scheme, all inputs have hard-wired priority that can not be changed, and requests for the bus are serviced in order of priority. The problem with this scheme is that in some cases lower priority agents are locked off the bus although they are performing an important function at that point in time thereby reducing overall system efficiency.

In a rotating priority scheme the agent granted arbitration is the one that requested it first. All requests made after the first are queued, or stored, in order of assertion. After the first request is serviced, the request asserted second is serviced, and so on. If the request just serviced is asserted again before all other active requests are serviced it is placed at the end of the queue. The problem of a rotating scheme is that an important request is not serviced until all previous request are serviced since no priority is given to requesting agents.

SUMMARY OF THE INVENTION

It is the object of the invention to indicate an arbitration scheme which increases the bus efficiency in multiprocessor system. According to the invention there is provided a multiprocessor system with a common bus and a central arbitration controller, which samples the request status of every system agent, wherein said arbitration controller grants bus accesses based on an arbitration scheme consisting of two rotating queues with a fixed priority between the queues.

DESCRIPTION OF THE PREFERRED EMBODIMENT

Figure 1:
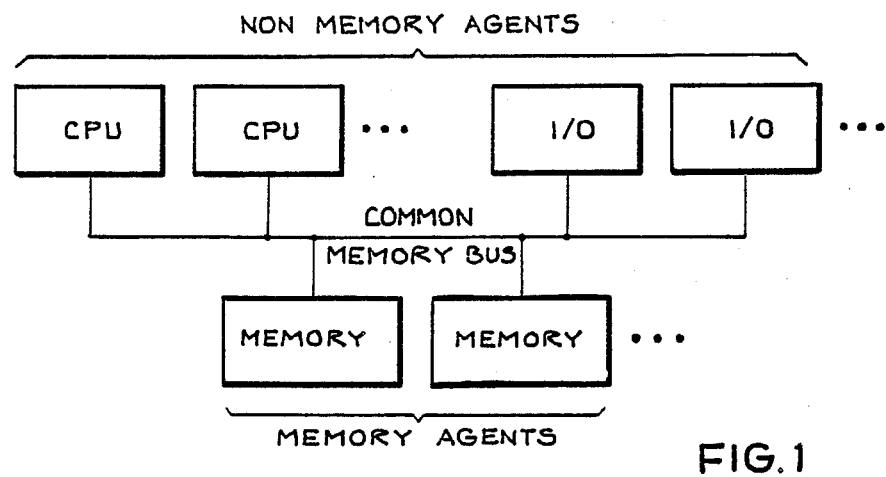
FIG. 1 shows the basic architecture of a typical multiprocessor computer system.
Figure 2:
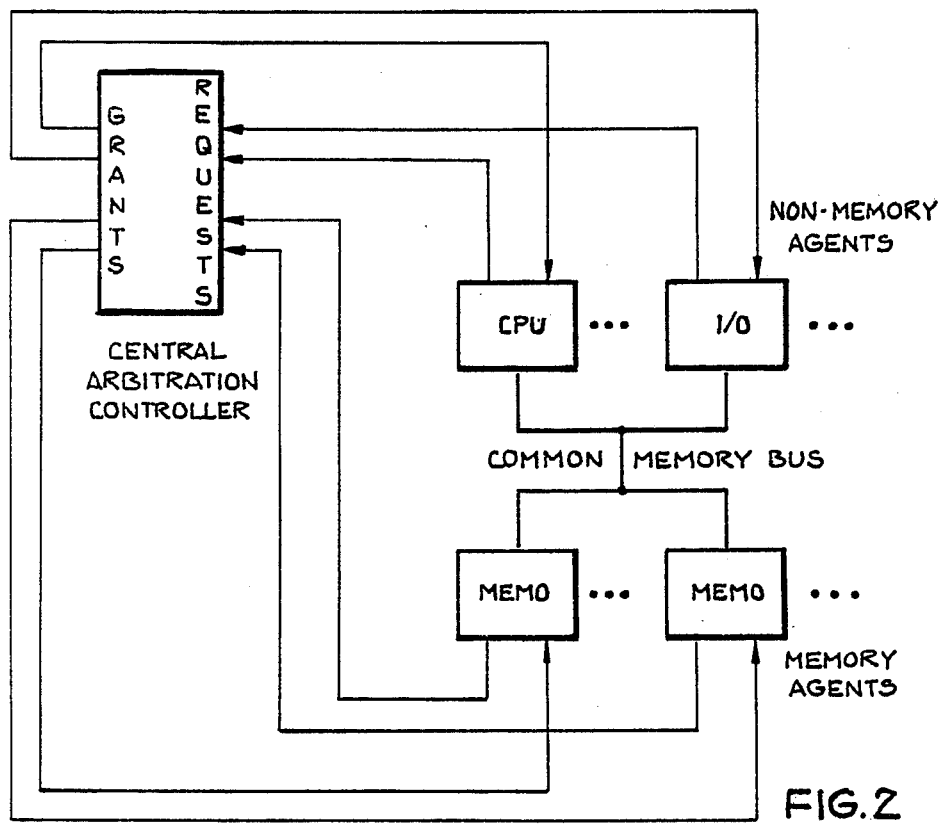
FIG. 2 shows the typical microprocessor computer system having a central arbitration controller which controls access to the common bus.
Figure 3:
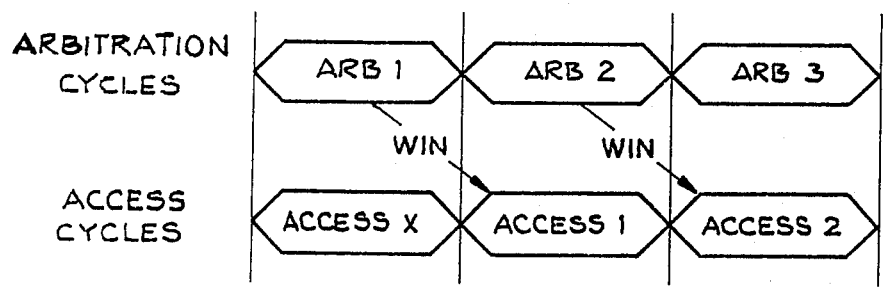
FIG. 3 shows arbitration cycles and access cycles.
Figure 4:
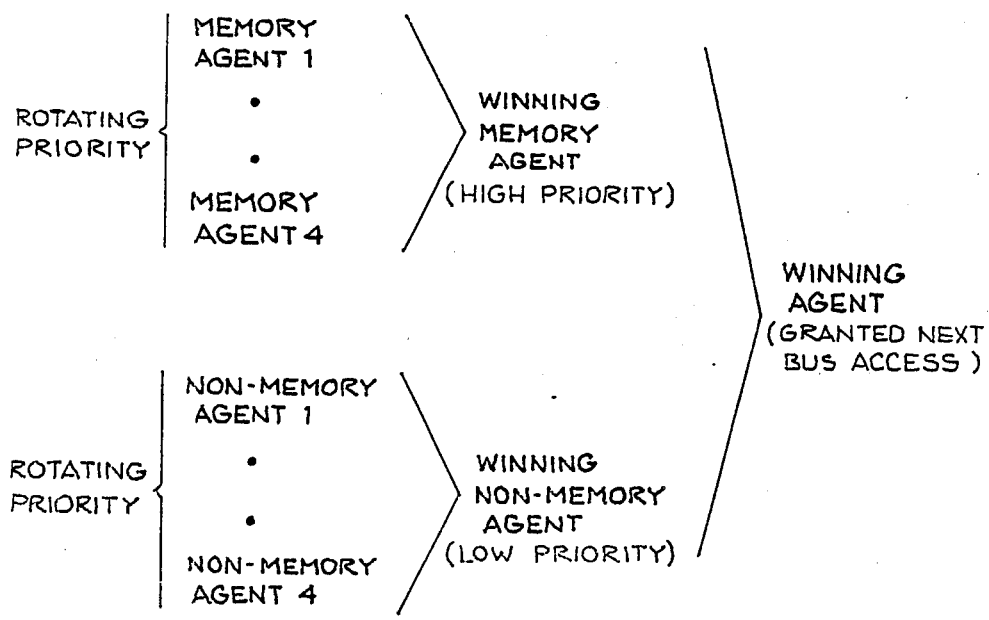
FIG. 4 shows an arbitration algorithm.

The arbitration function is handled by a central arbitration controller located on the system bus. Each agent on the bus has a request and a grant signal. The arbitration controller will sample the request status of every system agent and grant bus accesses based on the dual rotating priority arbitration scheme. All agents requesting bus access in a given sample cycle will be serviced before another sample is taken. In order to achieve maximum bus bandwidth, arbitration cycles will be pipelined with access cycles as shown in FIG. 3. The arbitration scheme consists of a rotating queue of memory agents, a rotating queue of non-memory agents, and fixed priority between queues as shown in FIG. 4.

Figure 5:
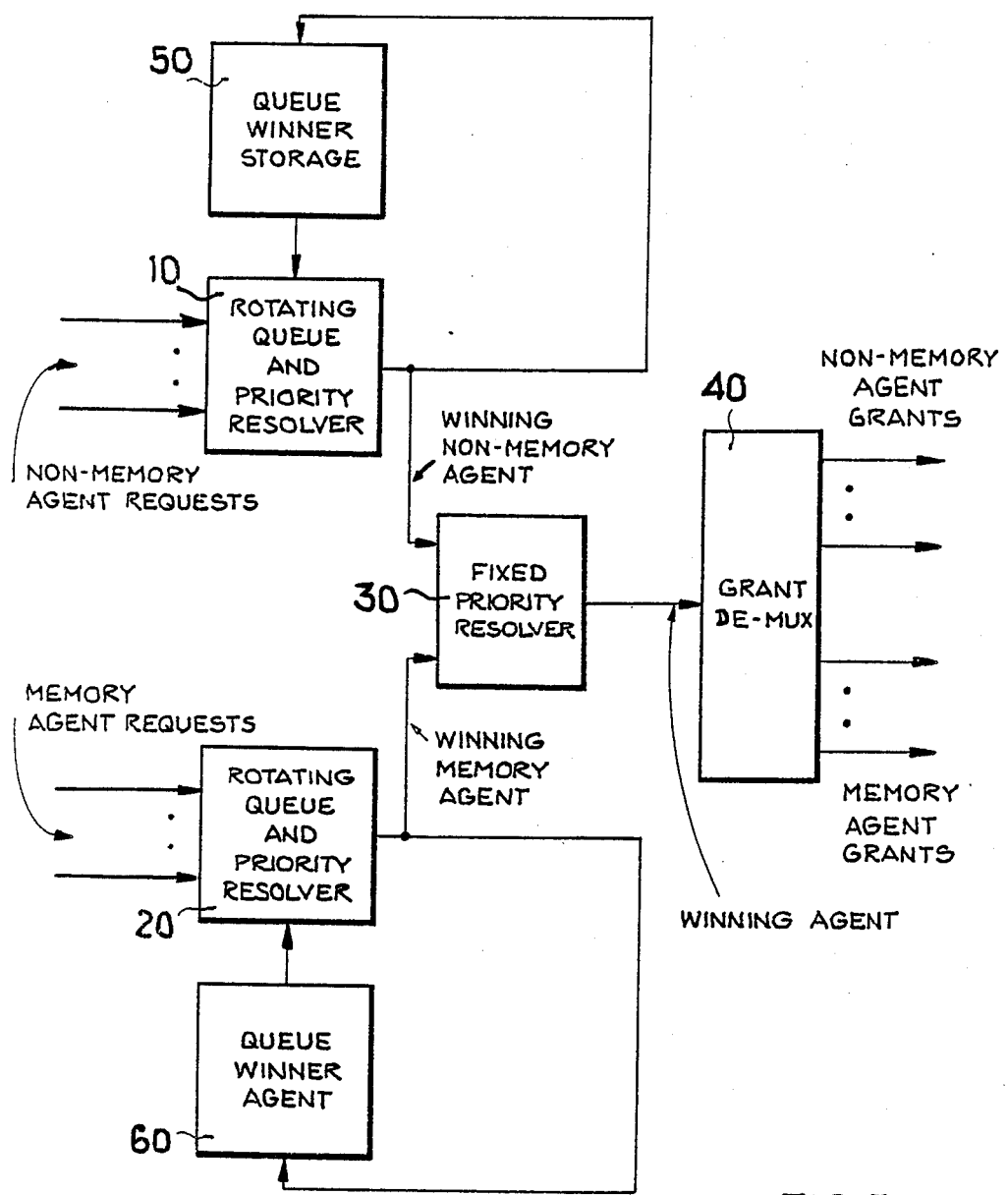
FIG. 5 shows a high level view of the central arbitration controller constructed in accordance with an embodiment of the present invention.

FIG. 5 illustrates an embodiment of a central arbitration controller for a common memory bus constructed in accordance with the present invention. Non-memory agent requests enter the device and are placed in a rotating queue 10. Likewise, memory agent requests enter the device and are placed in a rotating queue 20. Priority in these two queues is resolved on a rotating basis. The winning non-memory agent and winning memory agent are then forwarded to queue winner storage elements 50 and 60 and to the fixed priority resolver 30. The fixed priority resolver gives priority to memory agent requests (if any) over non-memory requests. The winning agent is forwarded to the grant de-mux. The winning agents are stored in 50 and 60 to allow the rotating queues and priority resolvers 10 and 20 to function properly each arbitration cycle. The grant de-mux 40 is notified of the winning agent and drives the appropriate grant signal.

Figure 6:
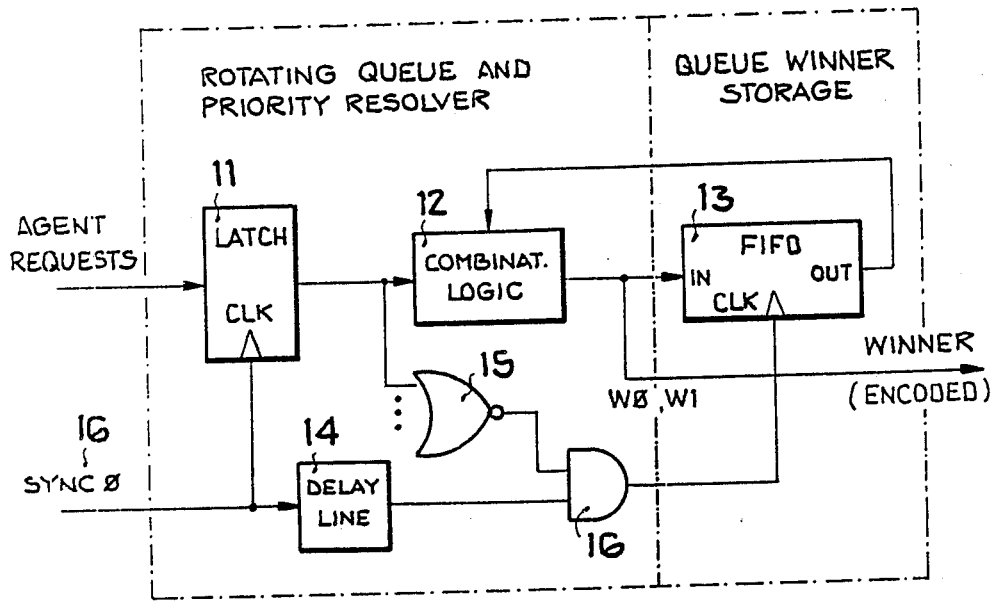
FIG. 6 shows an enlarged view of the rotating queue and priority resolvers 10 and 20 along with the queue winner storage elements 50 and 60.

FIG. 6 is an enlarged view of the rotating queue and priority resolver along with the queue winner storage elements. The latch 11 stores the sample of the requesting agents as defined by SYNCO 16. The latched data is then forwarded to the combinatorial logic 12 and the NOR gate 15. The combinatorial logic 12 determines the winner of the requesting agents by combining the previous winner stored in the FIFO 13 and the current state of request 11 and resolves priority on a rotating basis. The winner is then encoded in the logic 12 and forwarded to the fixed priority resolver 30 in FIG. 5. The NOR gate 15 through AND gate 16 prevents the FIFO from clocking in a state in which there was no winner (due to a lack of requests). The delay line 14 delays the clock signal into the FIFO to allow propagation through the logic 12.

Figure 7:
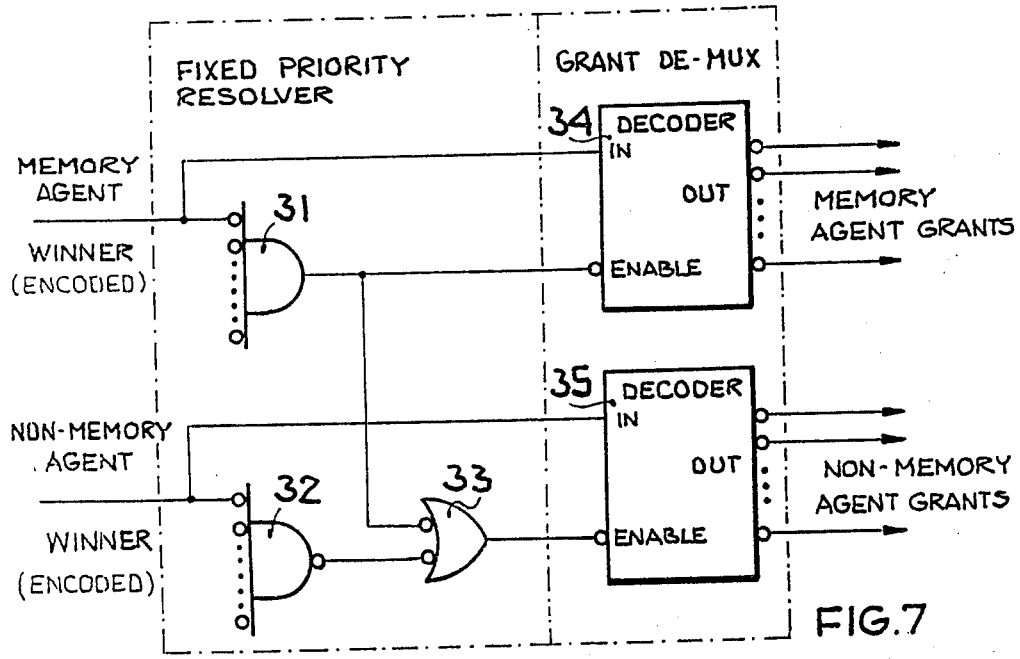
FIG. 7 shows an enlarged view of the fixed priority resolver 30 and the grant de-mux 40.

FIG. 7 is an enlarged view of the fixed priority resolver and the grant de-mux. The multi-input NOR gate 31 detects the condition where no requests from memory agents were made and disables the grant de-mux 34 based on this condition. If a request was made 34 is enabled and the winner is decoded in 34 and the appropriate memory agent grant is asserted. The multi-input OR gate 32 detects the condition where no requests are made and forwards this state to 33. The NAND gate 33 allows the decoder 35 to be enabled only if there was no memory agent winner and a non-memory agent is requesting (implementing fixed priority). If the non-memory agent winner is asserted and there is no memory agent winner, 35 decodes the non-memory agent winner and asserts the corresponding grant.

What is claimed is:

1. A multiprocessor system, comprising:

a common bus;

a plurality of first system agents connected to the bus and a plurality of second system agents connected to the bus, each system agent having means for selectively generating a request signal to request access to the bus; and central arbitration controller means for sampling the request signals generated by the system agents and for granting bus access based on an arbitration scheme having a plurality of rotating queues with a fixed priority between the queues, the central arbitration controller means including first latch means for storing request signals generated by the first system agents, first combinatorial logic means, responsive to the signals stored by the first latch means, for selecting the next first system agent to have priority, among the plurality of first system agents, in accessing the bus, and first FIFO memory means for storing a signal identifying a first system agent that was previously selected to have priority among the plurality of first system agents in accessing the bus, wherein the first combinatorial logic means is additionally responsive to the signal stored in the first FIFO memory means.

2. A multiprocessor system as defined in claim 1, wherein the central arbitration controller means further comprises a NOR gate, the NOR gate having input ports which receive the signals stored by the first latch means.

3. A multiprocessor system as defined in claim 1, wherein the first latch means is actuated at predetermined intervals to store request signals generated by the first system agents, wherein the first combinatorial logic means generates an output signal identifying the next first system agent selected, wherein the first FIFO memory means has a clock port and has an input port which receives the output signal of the first combinatorial logic means, and wherein the central arbitration controller means further comprises means for conveying a signal to the clock port of the first FIFO memory means for each predetermined period during which at least one first system agent generates a request signal.

4. A multiprocessor system as defined in claim 3, wherein the means for conveying a signal to the clock port comprises a NOR gate and an AND gate connected to the NOR gate.

5. A multiprocessor system as defined in claim 3, wherein the means for conveying a signal to the clock port comprises delay means for delaying the signal conveyed to the clock port to permit signal propagation through the first combinatorial logic means.

6. A multiprocessor system as defined in claim 1, wherein the central arbitration controller means further comprises:

second latch means for storing request signals generated by the second system agents;

second combinatorial logic means, responsive to the signals stored by the second latch means, for selecting the next second system agent to have priority, among the plurality of second system agents, in accessing the bus; and second FIFO memory means for storing a signal identifying a second system agent that was previously selected to have priority among the plurality of second system agents in accessing the bus, wherein the second combinatorial logic means is additionally responsive to the signal stored in the second FIFO means.

7. A multiprocessor system as defined in claim 6, wherein the central arbitration controller means further comprises fixed priority resolver means, connected to the first and second combinatorial logic means, for determining whether a first system agent or a second system agent will next access the bus.

* * * * *